Sept. 25, 1962

L. L. SMITH 3,055,984

PABX RESTRICTED SERVICE ADAPTER

Filed March 5, 1959

INVENTOR.
Lester L. Smith
BY
C. A. Gulbrandsen
Atty.

United States Patent Office 3,055,984

Patented Sept. 25, 1962

3,055,984

PABX RESTRICTED SERVICE ADAPTER

Lester L. Smith, McHenry, Ill., assignor to Automatic Electric Laboratories, Inc., a corporation of Delaware Filed Mar. 5, 1959, Ser. No. 797,477
18 Claims. (Cl. 179—27)

This invention relates in general to a telephone system, and more particularly, to means for blocking restricted subscribers in a private automatic branch exchange from making toll calls.

Due to seven digit codes being used for telephone central offices, restrictors are utilized at private automatic branch exchanges (PABX) to prevent restricted subscribers therein from making toll calls. One of the many systems utilized is the usage of an adapter circuit interposed between the PABX and the main automatic exchange (MAX) which checks all digits dialled. They further utilize in this system what is commonly known as an "AR" digit which is a digit dialled in a sequence which will automatically release the adapter from further respondence upon receipt of one of many predetermined digits. It will, however, block all toll call codes having a predetermined sequence of digits, such as "211." However, these adapters or restrictors become ineffective when a PABX restricted subscriber dialled these "AR" digits twice in succession to circumvent the restrictor, and then proceed to dial a toll code. This would occur when the restricted subscriber somehow found out what the "AR" digits were.

It is therefore an object of this invention to provide an adapter circuit interposed between a PABX and a central office, wherein if an "AR" digit is dialled within the first three digits the adapter checks the digit following the "AR" digit, and if the digit is not a restricted digit the adapter does not follow succeeding digits as the call is legitimate.

It is another object of the invention utilizing the mentioned adapter circuit, wherein if an "AR" digit is not dialled within the first three digits, the call will be blocked and transferred to the PABX intercept operator.

It is another object of the invention utilizing the mentioned adapter circuit, wherein if a cut-in digit is dialled on the first digit, the adapter does not follow the subsequent digits as the call is legitimate.

It is another object of the invention, wherein if special service codes begin with a predetermined digit and if restricted codes also contain this same digit, the digit is recorded and subsequent digits checked to determine if the call is to be restricted or not.

A feature of the invention resides in the utilization of six rotary switch levels, with three levels having one wiper apiece and three levels having three wipers apiece, whereby: a first of the single wiper levels checks a first digit dialled, a second of the single wiper levels checks a second digit dialled, the third of the single wiper levels checks a third digit dialled, and the three wiper levels aid in imposing the mentioned restrictions.

Further objects and features of the invention will become apparent from a perusal of the following specification taken in combination with the accompanying drawings, of which:

Figure 1:
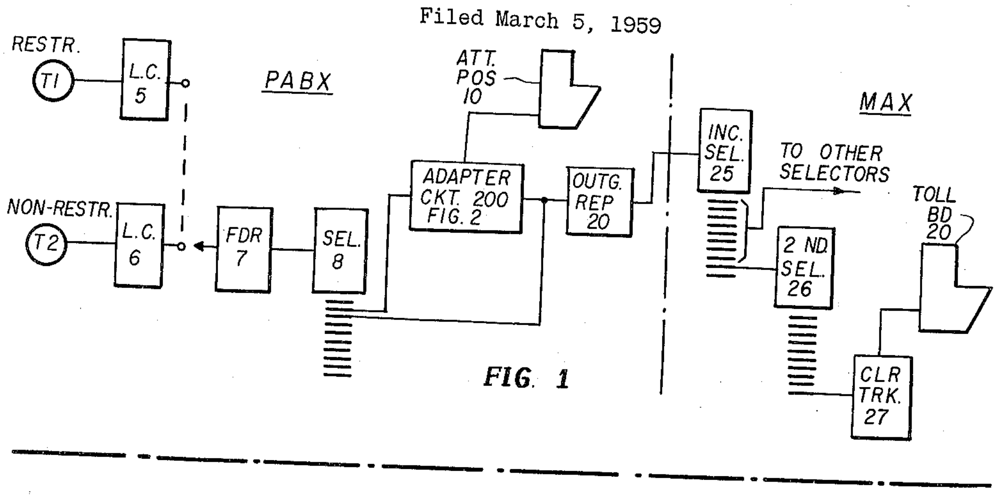
FIG. 1 shows a trunking diagram of a portion of a PABX and an MAX.
Figure 2:
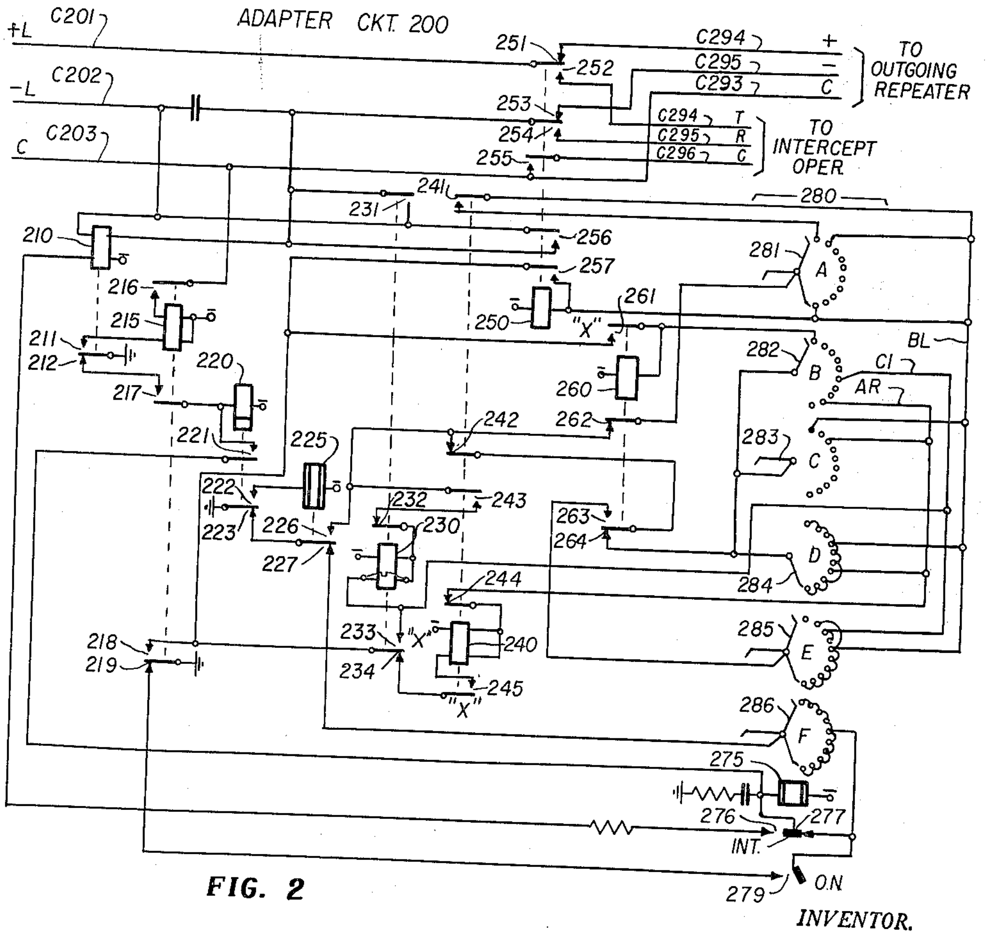
FIG. 2 shows an adapter circuit 200 comprising the novel features of this invention.

Referring briefly to FIG. 1, the PABX is of a conventional type wherein subscribers may call all other subscribers therein by dialling the directory PABX subscriber number wanted. This PABX has restricted substations, such as T1, who are denied toll calls but can make local calls through the MAX. This PABX also has executive or non-restricted substations, such as T2, who can make any type of call. A line circuit 5 for restricted substation T1 and a line circuit 6 for non-restricted substation T2 in combination with finder 7 and selector 8 is of the type disclosed in Patent No. 1,678,185, issued to R. W. Harper, or in Patent No. 1,380,039, issued to William A. Chapin. In either of these two patents, if a non-restricted party dials a predetermined digit into selector 8 the call will be extended to a main exchange. However, if a restricted party dials this same digit, the call will be blocked. It will be assumed that this digit will be the digit "8." In order for the restricted parties to make an MAX call the digit "9" must be dialled to first seize an MAX first selector via a repeater and an adapter circuit, such as 200 (FIG. 2). The adapter circuit 200 will react as a restrictor to check all digits dialled.

Referring to FIG. 2, the adapter circuit 200 comprises eight relays and a rotary switch 280. The rotary switch 280 comprises six levels of bank contacts A–F three of which are of the well-known three wiper type, wherein when one of these three wipers disengages the set of contacts a second wiper engages the set of contacts, and then the third wiper. Levels B, C, and D have only one wiper apiece spaced radially at different rotary positions whereby when the wiper of level B disengages from its set of contacts, the wiper of level C will engage its set, and when the wiper of level C disengages its set of contacts, the wiper of level D will engage its set of bank contacts. These wipers are stepped clockwise by a rotary magnet 275.

Connected to predetermined bank contacts are a plurality of conductors designated by the letters AR, BL, and CI. These lettered conductors appropriately designate AR conductors as "automatic release," BL conductors as "blocking," and CI conductors as "cut in," which will become more fully explained in the ensuing description. Levels B, C and D of rotary switch 280 are digit checking levels to insure that proper digits have been dialled. More specifically, wiper 282 and level B will check the first digit dialled to determine if this is an "AR" digit, a "BL" digit or a "CI" digit, whereby the adapter circuit 200 will respond in a manner to be later described. Furthermore, there are open contacts to be hereinafter referred to as "A" digits. Wiper 283 and level C will check the second digit in a like manner, and wiper 284 and level D will check the third digit. However, if an "AR" digit, a "BL" digit, or a "CI" digit is not dialled within the first three digits the call will be automatically transferred to an intercept operator. This is to prevent a restricted subscriber from continuously dialling "A" digits to beat the restrictor, in an illegitimate attempt at making a toll call. Therefore, the adapter circuit 200 will only release independently of the succeeding equipment when legitimate digits have been dialled by the restricted subscriber.

Before starting the detailed description a list of permissible codes and restricted digits will be given for the restricted subscriber. It will be assumed that the digit codes "113" and "114" are for special service and will be legitimate. The code "211" is for a CLR trunk extending to a toll operator and will be illegitimate. The code "0" is for a local operator's trunk and illegitimate. The codes "6XXXXXX," "94XXXXX," "338XXXX," and "3975XXX" are exchange number codes for subscribers in these exchanges (not shown) with the letters X designating any number of a seven digit directory number, wherein these codes are legitimate. The first two numbers of the exchange code would, of course, normally be letters designating an exchange name, such as code "338" may designate, for example, a telephone exchange named FEnwick 8.

To impose the mentioned restrictions, the digits in the order of dialling will now be given with the effect they have on the adapter 200.

| Digit | 1st digit | 2nd digit | 3rd digit |
|---|---|---|---|
| 1 | Ineffective | Blocked (BL-digit) | Blocked (BL-digit). |
| 2 | Blocked (BL-digit) | Ineffective (A-digit) | Do. |
| 3 | Ineffective | Automatic release (AR-digit). | Do. |
| 4 | do | Ineffective | Do. |
| 5 | do | do | Do. |
| 6 | Cut-In (CI-digit) | do | Do. |
| 7 | Ineffective | do | Automatic release (AR-digit). |
| 8 | do | do | Blocked (BL-digit). |
| 9 | Automatic release (AR-digit). | do | Do. |
| 0 | Blocked (BL-digit) | do | Do. |

The above list only holds true if "AR" digits are not dialled within the first three digits. If "AR" digits are dialled in any of the above sequences, the following digit thereafter will cut in and release the adapter, unless that following digit is a "BL" digit whereby the call will be transferred to an intercept operator. The term "Ineffective" means the adapter circuit 200 will be ineffective to this digit and will be responded to only by the succeeding equipment. It merely means this digit A is legitimate but determines nothing as far as the adapter circuit is concerned, except that as yet the calling party has not dialled an improper digit, but does add to the counting and checking of digits dialled. In other words, if the calling party dials more than two "Ineffective" A digits the call will be transferred to the intercept operator simply because these digits in their sequence do not pertain to any existing destination.

A detailed description will not follow:

*PABX Calls*

PABX calls by either the restricted subscriber T1 or the unrestricted subscriber T2 are unlimited within the private automatic branch exchange, and can be made in any well-known manner via the line circuit 5 for subscriber T1 and the line circuit 6 for subscriber T2 through a finder 7 and selector 8. These calls are unlimited according to the number of subscriber stations within the PABX, providing these stations do not dial the first digit "8" or "9" which designate outside calls which will be described more fully in the ensuing description.

*Non-Restricted MAX Calls*

The non-restricted subscriber station T2 has a line circuit 6 of the type described in a patent to W. A. Chapin, Patent No. 1,380,039, or may have a line circuit so described in a patent to R. W. Harper, Patent No. 1,678,185. In both of these patents, a non-restricted subscriber in a PABX has access to a specific level on a first PABX selector which is denied to a restricted subscriber, such as T1. It will be assumed that this level will be the eighth level on selector 8. Thus, when the non-restricted subscriber at station T2 dials the digit "8" the selector 8 will step to the eighth level, and rotate thereover in search of an idle repeater linking a first selector at the main automatic exchange MAX. In the above-mentioned patents, on this restricted level, a set of normal post springs would operate to block restricted callers but a non-restricted subscriber such as T2 would have a line circuit which would make these normal post springs ineffective.

Assuming the non-restricted subscriber seizes out-going repeater 20 linked to incoming first selector 25, the subscriber can dial freely without any further restrictions. For instance, should the subscriber at station T2 make a toll call, the dialling of the toll code "211" after extension of the connection to the main exchange would extend the call via a second selector 26 over the second level of selector 25, and over the first level of selector 26 to a CLR trunk 27 linked with a toll board 30. The second digit "1" would, in this case, be absorbed by selector 26 in any well-known manner. Other calls would likewise be extended in a well-known manner.

*Restricted MAX Calls*

Assuming that the restricted subscriber at station T1 attempts to make a MAX call, the lifting of the receiver from the hookswitch thereat will close a loop circuit to line circuit 5 and cause a finder, such as 7, to hunt for this line circuit in a well-known manner. Upon the finder 7 finding the line circuit 5, the loop circuit will be extended to a linked PABX first selector 8 in a well-known manner.

Should this restricted subscriber attempt to bypass the adapter circuit 200 by dialling the digit "8" into selector 8, the normal post springs therein will operate as previously described in the reference to the patent of Chapin or Harper, to send busy tone to the calling party to notify him of the restriction.

In order for the restricted subscriber to make an MAX call, he must first dial the digit "9," which will cause selector 8 to seize an idle first selector at the MAX over the ninth level thereof, via an outgoing repeater 20 and through an adapter circuit such as 200 (FIG. 2). A loop circuit is thus closed to the MAX first selector, such as 25, over positive conductors C201 (FIG. 2), contacts 251, conductor C294 to the line relay in selector 25, and over negative conductor C202 winding of relay 210, contacts 253, and conductor C295 to said line relay (not shown). Line relay 210 will operate in series with the line relay in selector 25, and at contacts 211 will close an obvious circuit to relay 215. Relay 215 operates, closing a locking circuit at contacts 216 from ground returned over control conductor C293 via selector 25. Contacts 217 close to prepare a circuit to relay 220, and contacts 218 close to prepare circuits to relays 230, 240, 250, and 260.

*A First Cut-in Digit is Dialled*

Assuming that the restricted subscriber after seizing selector 25 via adapter circuit 200 decides to dial a subscriber in the MAX area which has a directory number "6XXXXXX," the "X's" designating any numbers. A first digit "6," as previously disclosed, is an immediate cut-in digit.

Upon calling party dialling the first digit "6," the line relay 210 will intermittently release and operate six times in series with the line relay in MAX selector 25. Upon the first intermittent release of relay 210, contacts 212 close a circuit to relay 220 via contacts 217. Relay 215 being locked operated via contacts 216 are not affected by the intermittent openings of relay 211. Relay 220 operates, and being of the slow-to-release type, remains operated during the digital impulse series. Contacts 221 close an obvious pulsing circuit to rotary magnet 275 via contacts 212 and 217. Contacts 222 close an obvious circuit to relay 225. Relay 225 operates, closing contacts 226 to prepare circuits through contacts of relays 230, 240 and 250. Relay 210 intermittently opening and closing contacts 212 six times will pulse rotary magnet 275 to step the wipers 281, 282, 283, 284, 285, and 286 of rotary switch 280 six steps. On the wipers taking their first step, the off-normal springs operate to close ON contacts 279 to prepare a self-interrupter circuit to rotary magnet 275.

At the termination of the six digital impulses the wipers 281, 282, 285, and 286 will be engaging their respective sixth bank contact. Relay 220 will restore after its slow-to-release interval, opening at contacts 222 the circuit to relay 225, however, relay 225 is also slow-to-release and remains operated a short interval. Contacts 223 close ground via contacts 226, 242, 264, wiper 282 of level B, conductor CI, lower and upper winding of relay 230 to battery. Relay 230 operates, closing its "X" contacts 233 first to lock relay 230 operated from ground at contacts 218. Thereafter, contacts 231 close to short-circuit the upper winding of relay 210 to prevent this relay from further respondence to digital impulses. After its slow-to-release interval relay 225 restores, closing at contacts 227 a self-interrupter circuit to rotary magnet 275; the circuit extending from battery, winding of rotary magnet 275, interrupter contacts 277, multiplied contacts of level F, wiper 286, contacts 227 and 223 to ground. By means of its self-interrupter contacts 276 and 277, rotary magnet 275 will energize and deenergize to step the wipers 281–286 to their second normal positions whereby wiper 286 will disengage the contacts of level F to open the circuit to rotary magnet 275. In this second normal position, wiper 282 of level B is in the rotary position shown for wiper 284 of level D in FIG. 2; wiper 283 of level C will be in the rotary position shown for wiper 282 of level B; and wiper 284 of level D will be in the rotary position shown for wiper 283 of level C. The off-normal springs ON will not open in this second normal position because they are 360° off-normal springs and will not open except in the first normal position as shown in the drawing.

The short-circuit placed across relay 210 will cause this relay to restore, wherein contacts 212 will reclose the circuit to relay 220 which operates, and which in turn closes at contacts 222 the circuit to reoperate relay 225. These last two operations, however, are insignificant at this time.

The calling subscriber may then dial the remainder of the directory number via selector 25 and the adapter circuit 200 is now disabled, since relay 230 at contacts 231 will prevent relay 210 from further respondence to digital impulses.

*Restricted Digit Dialled*

Assuming that the restricted subscriber attempts to dial the MAX local operator by dialling the digit "0" the call will be blocked and transferred to the PABX intercept operator.

Upon receipt of the first digit "0," the ten impulses will step the rotary switch wipers to their respective tenth bank contacts in a manner previously described. At the termination of the ten digital impulses, relay 220 will restore after a short duration, closing at contacts 223 a circuit to relay 250. This last circuit extending from ground, contacts 223, 226, 262, wiper 281 and tenth contact of level A, conductor BL, winding of relay 250 to battery. Relay 250 operates, closing at contacts 257 a locking circuit for itself to ground via contacts 218. Contacts 251 and 253 open the circuit to selector 25 to cause restoration thereof. Contacts 252 and 254 close a loop circuit via conductors C294 and C295 respectively to the PABX operator's intercept position 10, including the connection of control conductor C296 to control conductor C293 by the closing of contacts 255. Contacts 256 close to short-circuit relay 210 to cause restoration thereof and prevent adapter circuit 200 from responding to further digital impulses. The intercept operator at position 10 will thus notify the calling subscriber that he is restricted from making this call. The calling subscriber will then hang up his receiver to release the equipment in a manner to be described in the ensuing description.

Assuming that the restricted subscriber at station T1 attempts to make a toll call by dialling the toll code "211," the call will also be blocked and transferred to the intercept operator. The dialling of the first digit "2" of the toll code will cause wiper 281 on level A of rotary switch 280 to engage the second contact connected to the BL conductor to cause the adapter circuit 200 to transfer the call to the intercept operator in the identical manner described above upon dialling the first digit "0." Therefore, it is not deemed necessary for further explanation, except that it should be pointed out that the dialling of the last two digits "11" of the toll code will be ineffective due to the operation of relay 250 short-circuiting relay 210 at contacts 256.

*An "AR" Digit is Dialled*

Assuming that the restricted subscriber dials an "AR" digit within the first three digits and no restricted or cut-in level has been dialled preceding it, nor a restricted digit follows it, the adapted circuit 200 will release from further respondence upon receipt of the digit following the "AR" digit.

It will be assumed that the subscriber desires to call a subscriber accessible from the MAX having the previously described director number "94XXXXX." Upon receipt of the first digit "9," the wipers 281, 282, 285, and 286 will step to their respective ninth bank contacts in a manner previously described. Wiper 282 on level B upon engaging the ninth bank contact connected to conductor AR will close a circuit to the upper winding of relay 240; the circuit extending from battery, upper winding of relay 240, contacts 244, conductor AR, ninth contact and wiper 282 of level B, contacts 264, 242, 226 to ground at contacts 223 when relay 220 restores after its slow-to-release interval. Relay 240 operates, closing its X contacts 245 first to lock relay 240 operated via contacts 234 and 218 to ground via its lower and upper windings. Relay 240 will thereafter operate its remaining contacts when relay 225 restores after its slow-to-release interval whereby contacts 241 close to prepare a circuit to relay 250. Contacts 242 open ground to the wipers of levels B, C and D of switch 280; contacts 243 close to prepare a circuit to relay 230; and contacts 244 further open the original operating circuit to relay 240. The wipers will be automatically stepped to their respective second normal positions as previously described.

On the next digit dialled, a circuit is closed to relay 230 unless the digit is a restricted digit "1," "2," or "0." Upon receipt of the second digit (any digit from 3–9) which has been assumed to be the digit "4" will, in this case, cause the wipers 281, 283, 285, and 286 to engage their respective fourth bank contacts in a manner previously disclosed. After the slow-to-release interval of relay 220, a ground is closed to the upper winding of relay 230 via contacts 223, 226, 243, and 232. Relay 230 will operate, closing its X contacts 233 first to close a locking circuit for itself to ground at contacts 218. When relay 225 restores, after its slow-to-release interval, to open contacts 226, the two-step relay 230 will operate its remaining contacts to short-circuit relay 210 at contacts 231 and prevent adapter circuit 200 from further digital impulse respondence as previously described. The release of relay 225 at contacts 227 will again close the self-interrupter circuit to rotary magnet 275 to step the wipers to their respective third normal positions. The remaining digits of the called directory number will be responded to directly by the succeeding equipment.

It will next be assumed that the restricted subscriber desires to call a subscriber accessible from the MAX, having the previously described directory number "338-XXXX." Upon receipt of the first digit "3" the wipers 281, 282, 285, and 286 will step to their respective third contacts which is as previously described an "ineffective" contact as far as the adapter circuit 200 is concerned. This digit "3," however, would step the selector 25 accordingly to seize a succeeding switch, or selector 25 may absorb the digit by any well-known absorbing means. Wipers 281 and 282 will thus be engaging open contacts. After the slow-to-release interval of relays 220 and 225, the self-interrupter circuit to rotary magnet 275 is closed to step the wipers to their respective second normal positions in a manner previously disclosed.

Upon receipt of the second digit "3," the wipers 281, 283, 285, and 286 will engage their respective third contacts of rotary switch 280. This second digit "3" is an "AR" digit and will close a circuit to relay 240 over a circuit including battery, upper winding of relay 240, contacts 244, conductor AR, third contact and wiper 283 of level C, contacts 264, 242, 226, to ground at contacts 223 when relay 220 restores after its slow-to-release interval. Relay 240 will operate in a manner previously described to permit the adapter circuit to release on the next digit unless the next digit is "1," "2," or "0." After the slow-to-release interval of relays 220 and 225 the wipers will be automatically stepped to their respective third normal positions.

Since it was assumed that the third digit was the digit "8," rotary magnet 275 would step the wipers 281, 284, 285, and 286 to their respective eighth bank contacts upon receipt of the eight digital impulses. After its slow-to-release interval relay 220 will restore to close at contacts 223 the circuit to relay 230. Relay 230 will operate as previously described to prevent adapter circuit 200 from responding to further digital impulses. After its slow-to-release interval, relay 225 will release to close the self-interrupter circuit to rotary magnet 275 to restore the wipers to their first normal position as shown.

Had the restricted subscriber inadvertently dialled the digit "1," "2," or "0" as the third digit, the circuit to relay 250 would be closed in a manner previously disclosed through wiper 281 of level A or wiper 284 of level D, to transfer the call to the intercept operator.

Assuming next the calling of a subscriber having the previously described directory number "3975XXX." The dialling of the first digit "3" will operate adapter circuit 200 in the above previously described manner.

Upon receipt of the second digit, the digit "9," rotary magnet 275 will step the wipers 281, 283, 285, and 286 to the respective ninth bank contacts in a manner previously described. The second digit "9" is an ineffective digit as far as the adapter circuit is concerned since wipers 281 and 283 are in engagement with open contacts. At the end of their slow-to-release interval relays 220 and 225 will close the previously described self-interrupter circuit to rotary magnet 275 to step the wipers to their respective third normal positions.

Upon receipt of the third digit, the digit "7," rotary magnet 275 will step the wipers 281, 284, 285, and 286 to their respective seventh bank contacts. The third digit "7" is an "AR" digit and will close a circuit to relay 240 over a circuit including battery, upper winding of relay 240, contacts 244, conductor AR, seventh contact and wiper 284 of level D, contacts 264, 242, 226 and to ground via contacts 223 when relay 220 releases after its slow-to-release interval. Relay 240 will operate in a manner previously described to prepare a circuit to relay 230, to release adapter circuit 200 upon receipt of the fourth digit unless this digit is a blocking digit (any digit such as "1," "2," or "0"). Since it was assumed that the fourth digit was the digit "5," the adapter circuit 200 will release from further digital impulses after this digit has been received.

Assuming that the third digit in the above example had been any digit other than "7," wiper 284 would be engaging one of the multipled bank contacts on level D (seventh contact not multipled with remaining contacts) and would close a circuit to relay 250 over a circuit comprising battery, winding of relay 250, conductor BL, bank contact 1, 2, etc. to the contact engaged by wiper 284, contacts 264, 242, 226 to ground at contacts 223 when relay 220 restores. The operation of relay 250 will close the calling circuit to the intercept operator in a manner previously described.

Thus in order to call a subscriber via the main exchange, the proper sequence of digits must be dialled by a restricted subscriber.

While one embodiment of the invention has been shown for connecting the blocking BL conductor, the cut-in CI conductor, and the automatic release AR conductor to the respective banks of the switch 280 in accordance with a specific numbering arrangement, it will be appreciated that with a different number arrangement the above-mentioned conductors would be connected to the bank contacts of switch 280 in a different manner.

*Release—Call Not Blocked*

Upon the termination of an unblocked call, when the called party hangs up to release the succeeding equipment, ground is removed from control conductor C293 to open the circuit to relay 215. Relay 215 restores, opening at contacts 218 the circuits to relays 230 and/or relay 260. Contacts 219 closes ground to rotary magnet 275 via ON contacts 279 and contacts 277. Relay 230 restores and relay 260 restores (if operated). By means of its self-interrupter contacts 277, rotary magnet 275 will self-interruptedly step the wipers of rotary switch 280 to their respective first normal positions, wherein ON contacts 279 will open this circuit to completely deenergize rotary magnet 275. Adapter circuit 200 will thus be in its normal unoperated condition.

*Release—Blocked Call*

After the intercept operator has informed the restricted subscriber of the restriction imposed, she will disconnect to remove ground from control conductor C296 to open the circuit to relay 215. Relay 215 restores, opening at contacts 218 the circuits to relays 240, 250, and/or relay 260. Contacts 219 closes the above-described self-interrupter circuit to rotary magnet 275 to return the wipers to their respective first normal positions. Relay 260 restores (if operated). Relay 250 restores, closing at contacts 251 and 253 the conductors C201 and C202 to conductors C294 and C295 respectively. Relay 240 restores.

*Special Service Calls*

Special service calls are restricted to the codes "113" and "114," for instance, for information and repair respectively. These digits or codes have to be dialled in their proper sequence since both restricted and special service codes contain the digit "1."

Upon receipt of the first digit, the digit "1," rotary magnet 275 will step the wipers 281, 282, 285, and 286 to their respective first bank contacts in a manner previously described. A circuit is closed to relay 260 via battery, winding of relay 260, first contact and wiper 282 of level B, contacts 264, 242, 226 and to ground at contacts 223 after the slow-to-release interval of relay 220. Relay 260 operates, and closes its "X" contacts 261 to lock relay 260 operated via ground at contacts 218. Contacts 262 open the prepared ground to wiper 281 of level A. Contacts 263 close to prepare ground to wiper 285 of level E, and contacts 264 opens the prepared ground to the wipers of levels B, C, and D. The restoration of relays 220 and 225 will also close the previously described self-interrupter circuit to rotary magnet 275 to step the wipers to their respective second normal positions.

Upon receipt of the second digit, the digit "1," relay 210 and magnet 275 follow the pulses but this digit does not determine whether or not this call is to be restricted or blocked until the third digit. The wipers 281, 283, 285, and 286 will thus engage their respective first bank contacts. Although a second digit "1" is normally a blocking digit, the circuit to relay 250 is opened at contacts 264 and will be ineffective at this time.

Upon receipt of the third digit, the digit "3" or "4," relay 210 and rotary magnet 275 follow the pulses to step the wipers 281, 284, 285, and 286 to their respective third or fourth bank contacts. A circuit is now closed to relay 230 over a circuit including battery, upper and lower winding of relay 230, conductor CI, third and/or fourth bank contact and wiper 285 of level E, contacts 263, 242, 226, and to ground at contacts 223 after the slow-to-release interval of relay 220. Relay 230 operates, closing its "X" contacts 233 first to lock relay 230 operated via ground at contacts 218. Thereafter, the remaining contacts of relay 230 operate as previously described. This call will thus have been completed through the succeeding equipment in a well-known manner.

Had the restricted subscriber inadvertently dialled any third digit other than "3" or "4," the call would be blocked and transferred to the intercept operator. For instance, the receipt of the digit "2" as the third digit would result in the operation of relay 250 over a circuit including battery, winding of relay 250, conductor BL, second contact and wiper 285 of level E, contacts 263, 242, 226 to ground at contacts 223 after the slow-to-release interval of relay 220. The operation of relay 250, as previously described, would transfer the call to the intercept operator.

We have thus provided a system wherein if an "AR" digit is not dialled within the first three digits, or a blocking digit "BL" is dialled, the call is transferred to an intercept operator. If an "AR" digit is dialled within the first three digits the adapter circuit is released from further respondence upon receipt of the next digit unless this following digit is a "BL" digit. And if a "CI" digit is dialled, the adapter circuit will release from further respondence immediately after response thereof.

Having described my invention in detail, what I claim and desire to have protected by issuance of Letters Patent of the United States is set forth in the appended claims.

What is claimed is:

1. In a telephone system, a plurality of restricted substations, a numerical switch, an adapter circuit, an intercept operator position directly accessible from said adapter circuit, means responsive to a call for extending a loop circuit from one of said substations to said numerical switch via said adapter circuit, switch means in said adapter circuit having wipers which may be operated to different operated positions, pulsing means in said adapter circuit responsive to digits dialled over said loop circuit for operating said switch means to move said wipers to a position corresponding to the digit dialled, disabling means in said adapter circuit controlled by the operated position of the wipers of said switch means for disabling said pulsing means, preparing means in said adapter circuit controlled by the wipers of said switch means in certain positions and operated responsive to the receipt of an "AR" dialled digit wherein said "AR" digit comprises either a first, a second, or a third received dialled digit of a first predetermined numerical value or values, blocking means in said adapter circuit controlled by the wipers of said switch means in other positions and operated responsive to the receipt of a "BL" digit wherein said "BL" digit comprises either a first, a second, or a third dialled digit of a second predetermined numerical value or values, transfer means in said adapter circuit effective responsive to the operation of said blocking means for transferring said call to said intercept operator's position, and completing means controlled by the wipers of said switch means when operated to particular positions responsive to the receipt of any dialled digit following the operation of said preparing means, other than a "BL" digit, for operating said disabling means to disable said pulsing means to thereby release said adapter circuit from further digit respondence.

2. In a telephone system as claimed in claim 1, including circuit means wherein said blocking means and said transferring means are also controlled by said switch means responsive to the failure to receive an "AR" digit within the first three digits dialled for transferring said call to said intercept operator's position.

3. In a telephone system as claimed in claim 1, including circuit means wherein said completing means is operated independently of said preparing means to disable said pulsing means responsive to the receipt of a "CI" dialled digit wherein said "CI" digit comprises a first, or a third dialled digit of a third predetermined numerical value or values.

4. In a telephone system, a plurality of restricted substations, a numerical switch, an adapter circuit, an intercept operator's position directly accessible from said adapter circuit, means responsive to a call for extending a loop circuit from one of said substations to said numerical switch via said adapter circuit, switching means in said adapter circuit comprising a plurality of levels of bank contacts and wipers therefor, a pulsing relay in said adapter circuit responsive to digits dialled over said loop circuit for operating said switching means to position said wipers in various positions on said bank contacts, a preparatory relay in said adapter circuit operated in response to said switching means being operated to a first set of wiper positions by the receipt of an "AR" dialled digit wherein said "AR" digit comprises either a first, a second, or a third dialled digit of a first predetermined numerical value or values corresponding to said first set of wiper positions, a blocking relay in said adapter circuit and operated responsive to said switching means being operated to a second set of wiper positions by the receipt of a "BL" dialled digit wherein said "BL" digit comprises either a first, a second, or a third dialled digit of a second predetermined value or values corresponding to said second set of wiper positions, transfer means in said adapter circuit responsive to the operation of said blocking relay for transferring said call to said intercept operator's position, a disabling relay in said adapter circuit for short-circuiting said pulsing relay, and a completing means effective responsive to the receipt of any dialled digit following the operation of said preparatory relay, other than a "BL" digit for operating said disabling relay to short-circuit said pulsing relay and release said adapter circuit from further dialled digit respondence.

5. In a telephone system, a plurality of restricted substations, a numerical switch, an adapter circuit, an intercept operator's position accessible from said adapter circuit, means responsive to a call for extending a loop circuit from one of said substations to said numerical switch via said adapter circuit, switching means in said adapter circuit comprising a plurality of levels of bank contacts and wipers therefor, pulsing means in said adapter circuit responsive to successive digits dialled over said loop circuit for successively operating and releasing said switching means for each received dialled digit to position said wipers in successive wiper positions, disabling means in said adapter circuit for disabling said pulsing means, preparing means in said adapter circuit operated in response to said switching means being operated to position said wipers in successive different ones of said wiper positions by the receipt of an "AR" dialled digit wherein said "AR" digit comprises either a first, a second, or a third dialled digit of a first predetermined numerical value or values, blocking means in said adapter circuit operated in response to said switching means being operated to position said wipers in successive further ones of said wiper positions by the receipt of a "BL" dialled digit wherein said "BL" digit comprises either a second, or a third dialled digit of a second predetermined numerical value or values, transfer means responsive to the operation of said blocking means for transferring said call to said intercept operator's position, and completing means operated responsive to the receipt of any dialled digit following the operation of said preparing means, other than a "BL" digit, for operating said disabling means to disable said pulsing means and release said adapter circuit from further digit respondence.

6. In a telephone system as claimed in claim 5, including circuit means controlled by the position of said wipers to operate said completing means independent of said preparing means responsive to the receipt of a "CI" digit wherein said "CI" digit comprises either a first, or a third dialled digit of a third predetermined numerical value or values.

7. In a telephone system, a plurality of restricted substations, a numerical switch, an adapter circuit, an intercept operator's position accessible from said adapter circuit, means responsive to a call from any of said substations for extending a loop circuit from one of said substations to said numerical switch via said adapter circuit, a rotary switch in said adapter circuit having a plurality of levels of bank contacts and wipers therefor, pulsing means in said adapter circuit responsive to digits dialled over said loop circuit for operating said rotary switch wipers to different rotary positions, a first of said levels of bank contacts for checking first dialled digits received over said loop circuit, a second of said levels of bank contacts for checking second dialled digits received over said loop circuit, a third of said levels of bank contacts for checking third dialled digits received over said loop circuit, transferring means in said adapter circuit automatically effective to transfer said call to said intercept operator's position responsive to the receipt of three checked dialled digits having any combination of digits designating a toll call, or having any combination of digits designating a restricted call.

8. In a telephone system as claimed in claim 7, wherein said rotary switch wipers have three intermediate normal positions, and means controlled through a fourth of said levels of bank contacts for automatically stepping said wipers to a different intermediate normal position after each dialled digit has been checked.

9. In a telephone system, a calling line, called lines, an adapter circuit, an intercept operator's position, means responsive to a call from said calling line for establishing a connection from said calling line to said adapter circuit, means for transmitting a series of successive dialled digits over said connection from said calling line to establish connections to said called lines, blocking means in said adapter circuit, means for operating said blocking means in response to first dialled digits having respectively different predetermined values received over said connection, means for operating said blocking means in response to second dialled digits having respectively said different predetermined values received over said connection following the receipt of predetermined first dialled digits, means for operating said blocking means in response to third dialled digits having respectively said different predetermined values received over said connection following the receipt of predetermined combinations of first and second dialled digits, and means controlled by the operation of said blocking means for routing the call from said calling line to said intercept operator's position.

10. In a telephone system as claimed in claim 9, including means for operating said blocking means in response to fourth dialled digits having respectively said different predetermined values received over said connection following the receipt of predetermined combinations of first, second and third dialled digits.

11. In a telephone system as claimed in claim 9, including disabling means in said adapter circuit operated responsive to the operation of said blocking means for disabling said adapter circuit from further respondence to dialled digits.

12. In a telephone system, a calling line, called lines, an adapter circuit, an intercept operator's position, means responsive to a call from said calling line for establishing a connection from said calling line to said adapter circuit, means for transmitting a series of successive dialled digits over said connection for extending said connection to said called lines; a marking switch in said adapter circuit comprising a plurality of levels of bank contacts, means operative responsive to the receipt of successive digits dialled for successively marking certain levels of bank contacts, means effective to a predetermined marking on a first of said certain levels of bank contacts responsive to the receipt of a first predetermined dialled digit for disabling the remainder of said certain levels of bank contacts and enabling the marking on another level of bank contacts to be effective to a third dialled digit, and means effective only to a predetermined marking on said another level of bank contacts responsive to the receipt of predetermined third dialled digits following the receipt of predetermined second dialled digits for disabling said adapter circuit, and shunting means effective by the disablement of said adapter circuit for permitting the extension of said connection to said called lines independent of said adapter circuit responsive to the receipt of subsequent dialled digits.

13. In a telephone system, a calling line, restricted called lines each having an assigned plural digit directory number including a blocking digit in their first four assigned digits, non-restricted called lines each having an assigned plural digit directory number including a cut-in digit (and excluding any blocking digit) in their first plurality of assigned digits, an adapter circuit, switching apparatus for establishing a call from said calling line to said non-restricted called lines, means responsive to a call from said calling line for establishing a connection from said calling line through said adapter circuit to said switching apparatus, means for transmitting a series of successive dialled digits corresponding to said assigned plural digit directory numbers from said calling line over said established connection to said adapter circuit and to said switching apparatus, means in said switching apparatus responsive to the transmission of the digits in the plural digit directory numbers of non-restricted called lines for completing connections from said calling line to said non-restricted called lines, an intercept operator position, pulse responding means in said adapter circuit operated in response to the receipt of one or more of said dialled directory digits from said calling line, blocking means in said adapter circuit operated by said pulse means in response to the receipt of a dialled blocking digit for disconnecting said calling line from said switching apparatus, for connecting said calling line to said intercept operator position and for disabling said pulse means from respondence to subsequent dialled digits, and cut-in means in said adapter circuit operated by said pulse means in response to the receipt of a cut-in digit of a non-restricted called line directory number for disabling said pulse means from respondence to subsequent dialled digits of said directory numbers to thereby prevent operation of said blocking means.

14. In a telephone system as claimed in claim 13, wherein one of said cut-in digits comprises the first dialled digit of said assigned plural digit directory numbers of a group of said non-restricted called lines all having the same first directory digit.

15. In a telephone system as claimed in claim 13, wherein a plurality of said cut-in digits comprise a plurality of second or third dialled digits of different predetermined values following the dialling of a particular one predetermined first dialled digit of another value in the assigned plural digit directory numbers of a plurality of groups of non-restricted called lines all having the same first directory digit corresponding to said other value and said different second and third directory digits corresponding to said different predetermined values.

16. In a telephone system as claimed in claim 13, wherein a plurality of said cut-in digits comprise a plurality of second dialled digits of different predetermined values following the dialling of a particular one predetermined first dialled digit in the assigned plural digit directory numbers of a group of non-restricted called lines all having the same first dialled directory digit corresponding to said one particular predetermined first digit.

17. In a telephone system as claimed in claim 13, wherein a plurality of said cut-in digits comprise a plurality of third dialled digits of different predetermined values following the dialling of a particular one predetermined second dialled digit in the assigned plural digit directory numbers of a group of non-restricted called lines all having the same second dialled directory digit corresponding to said one particular predetermined second digit.

18. In a telephone system as claimed in claim 13, wherein a plurality of said cut-in digits comprise a plurality of fourth dialled digits of different predetermined values following the dialling of a particular one predetermined third dialled digit in the assigned plural digit directory numbers of a group of non-restricted called lines all having the same third dialled directory digit corresponding to said one particular third digit.

References Cited in the file of this patent

UNITED STATES PATENTS

| | | |
|---|---|---|
| 2,039,668 | Stokely | May 5, 1936 |
| 2,707,727 | Pharis | May 3, 1955 |
| 2,763,724 | Lomax | Sept. 18, 1956 |
| 2,813,930 | Berch | Nov. 19, 1957 |
| 2,916,555 | Gatzert | Dec. 8, 1959 |
| 2,921,987 | Pedrick | Jan. 19, 1960 |